(12) United States Patent
Kini et al.

(10) Patent No.: US 8,064,338 B2
(45) Date of Patent: *Nov. 22, 2011

(54) HVPLS HUB CONNECTIVITY FAILURE RECOVERY WITH DYNAMIC SPOKE PSEUDOWIRES

(75) Inventors: Sriganesh Kini, Fremont, CA (US); Rishi Mehta, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 226 days.

This patent is subject to a terminal disclaimer.

(21) Appl. No.: 12/347,863

(22) Filed: Dec. 31, 2008

(65) Prior Publication Data

US 2010/0165832 A1 Jul. 1, 2010

(51) Int. Cl.
*G01R 31/08* (2006.01)
*G06F 11/00* (2006.01)

(52) U.S. Cl. .................. 370/225; 370/216; 370/228
(58) Field of Classification Search .................. 370/217, 370/218, 225, 228; 709/235
See application file for complete search history.

(56) References Cited

U.S. PATENT DOCUMENTS

| | | | |
|---|---|---|---|
| 7,283,465 | B2 | 10/2007 | Zelig et al. |
| 7,619,966 | B2 | 11/2009 | Lee |
| 2004/0174887 | A1* | 9/2004 | Lee ........................... 370/395.53 |
| 2007/0076719 | A1* | 4/2007 | Allan et al. ................... 370/392 |
| 2009/0109861 | A1 | 4/2009 | Kini et al. |
| 2009/0154339 | A1* | 6/2009 | Zi .................................. 370/217 |
| 2009/0201831 | A1 | 8/2009 | Kumar et al. |
| 2009/0245261 | A1* | 10/2009 | Khan et al. ............... 370/395.53 |

OTHER PUBLICATIONS

Brockners, Frank, et al., "Metro Ethernet—Deploying the extended Campus using Ethernet Technology," Proceedings of the 28th Annual IEEE International Conference on Local Computer Networks (LCN'03), 0742-1303/03, 2003, 11 pages.
"IEEE Standard for Local and Metropolitan Area Networks—Virtual Bridged Local Area Networks, Amendment 5: Connectivity Fault Management," IEEE Computer Society, Sponsored by the LAN/MAN Standards Committee, IEEE Std. 802.1ag™ -2007, Dec. 17, 2007, New York, NY, 260 pages.
Khandekar, Sunil, et. al., "Hierarchical Virtual Private LAN Service, draft-khandekarppvpn-hvpls-mpls-00.txt," Internet Draft, Nov. 2001, 12 pages.
Nadeau, T., et al., "Pseudowire Virtual Circuit Connectivity Verification (VCCV): A Control Channel for Pseudowires," Request for Comments (RFC) 5085, Dec. 2007, 30 pages.

(Continued)

*Primary Examiner* — Huy D Vu
*Assistant Examiner* — Omer Mian
(74) *Attorney, Agent, or Firm* — Blakely, Sokoloff, Taylor & Zafman LLP

(57) ABSTRACT

Techniques for recovering from hierarchical virtual private LAN service (HVPLS) hub connectivity failure with a dynamic spoke pseudowire. According to one embodiment of the invention, a provider edge (PE) network element in the HVPLS hub monitors for a failure of HVPLS hub connectivity failure and reuses an HVPLS spoke connectivity failure recovery mechanism in an MTU by fabricating failure of one or more spoke facing connectivity elements coupling the MTU with the PE network element causing the MTU to transition to a secondary PE network element in the HVPLS hub. In addition, the PE network element establishes a dynamic spoke pseudowire for each virtual instance affected with the MTU to restore HVPLS hub connectivity for that PE network element.

23 Claims, 5 Drawing Sheets

OTHER PUBLICATIONS

Lasserre, M., et al., "Virtual Private LAN Service (VPLS) Using Label Distribution Protocol (LDP) Signaling," Request for Comments (RFC) 4762, Jan. 2007, 31 pages.

Khandekar, et al., Provider Provisioned VPN Working Group, Internet Draft, Jun. 2002, pp. 25.

Office Action for U.S. Appl. No. 12/060,122, dated May 13, 2010, 24 pages.

Notice of Allowance for U.S. Appl. No. 12/060,122, dated Feb. 18, 2011, 9 pages.

* cited by examiner

HVPLS HUB CONNECTIVITY FAILURE RECOVERY WITH DYNAMIC SPOKE PSEUDOWIRES

BACKGROUND

1. Field

Embodiments of the invention relate to the field of networking; and more specifically, to hierarchical virtual private LAN service (HVPLS) hub failure recovery with dynamic spoke pseudowires.

2. Background

HVPLS (described in Internet Engineering Task Force (IETF) draft "draft-khandekar-ppvpn-hvpls-mpls-00", dated November 2001) is an extension of Virtual Private LAN Service (VPLS) (described and incorporated into Request For Comments (RFC) 4762 "Virtual Private LAN Service (VPLS) Using Label Distribution Protocol (LDP) Signaling", dated January 2007). VPLS allows networks at separate geographical locations to communicate with each other across a wide area network (WAN) as if they were directly attached to each other in a local area network (LAN). Customer Edge (CE) network elements, which are on the edge of geographically separate customer networks, are connected to Provider Edge (PE) network elements on an MPLS provider network. VPLS pseudowires (sometimes referred to as virtual circuits) are created and carried over Multiprotocol Label Switching (MPLS) tunnels. A pseudowire is configured for each pair of CE network elements that are to be connected into a virtual private LAN (i.e., for each CE that wishes to contact another CE). VPLS requires a full mesh of tunnels exist between all the PE network elements that participate in the VPLS service. To reduce the amount of signaling overhead and packet replication requirement of the full mesh, hierarchical connectivity (i.e., HVPLS) may be used.

An HVPLS network includes two tiers; a spoke tier and a hub tier. The spoke tier typically includes a multi-tenant unit (MTU) that is geographically located near the customer (i.e., customer network devices (e.g., switches, hubs, routers, bridges, computers, etc.) may be directly coupled with the MTU). The MTU is typically directly coupled with a PE network element over a single pseudowire (e.g., spoke pseudowire) for each VPLS service (e.g., a primary termination point for HVPLS spoke traffic). The MTU is not directly coupled with the other PE network elements in the HVPLS network. Thus, the MTU has a single point of connectivity to the hub. The hub tier includes the PE network elements which are coupled with a full mesh of pseudowires (i.e., hub pseudowires).

To protect against the spoke pseudowire failing or the primary termination point (e.g., the directly coupled PE network element) failing, the MTU may be dual-homed into two PE network elements. For example, for each pseudowire between the MTU and the directly coupled PE network element (referred to as primary pseudowires), a secondary pseudowire communicatively couples the MTU with a different PE network element (e.g., a secondary termination point for HVPLS spoke traffic). The MTU typically is able to detect a failure of the primary spoke pseudowire and/or failure of the primary termination point. Upon detecting the failure, the MTU may switch to the secondary spoke pseudowire and send HVPLS traffic to the second termination point.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
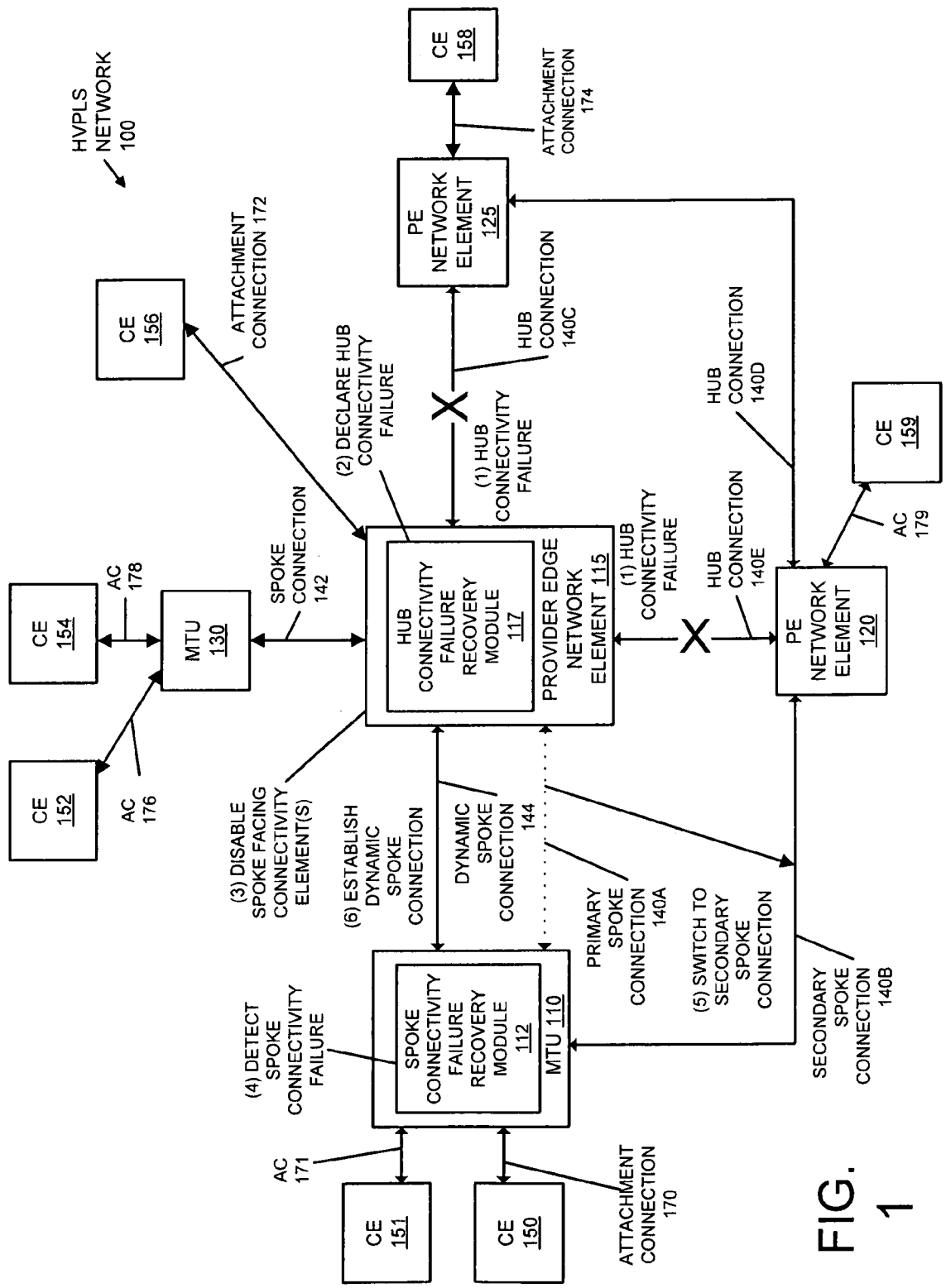
FIG. 1 is an exemplary data flow diagram illustrating a PE network element recovering from a failure of HVPLS hub connectivity failure by reusing an HVPLS spoke recovery mechanism in an MTU and establishing a dynamic HVPLS spoke connection to that MTU according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine readable storage media (e.g., magnetic disks; optical disks; random access memory; read only memory; flash memory devices) and machine readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Subscriber computer end stations (e.g., workstations, laptops, palm tops, mobile phones, etc.) access content/services provided over the Internet and/or content/services provided on virtual private networks (VPNs) overlaid on the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, subscriber computing end stations are coupled (e.g., through customer premise equipment coupled to an access network, wirelessly to an access network) to edge network elements, which are coupled through core network elements of the Internet to the server computing end stations.

Some edge network elements support the configuration of multiple contexts. As used herein, each context is an instance of a virtual network element (e.g., a virtual router or a virtual bridge). Each context typically shares one or more computing resources (e.g., memory, processing cycles, etc.) with other contexts configured on the edge network element, yet is independently administrable. For example, in the case of multiple virtual routers, each of the virtual routers shares computing resources, but is separate from those other virtual routers regarding its management domain, authentication, authorization, and accounting (AAA) name space, IP address, and routing database(es). By this separation, service providers may employ multiple contexts to provide direct network access for customers and/or provide different classes of services for customers.

Within an edge network element, multiple interfaces may be configured. As used herein, each interface is a logical entity, typically configured as part of a context, which provides higher-layer protocol and service information (e.g., Layer 3 addressing) and is independent of physical ports and circuits. AAA may be provided for through an internal or external server, such as a RADIUS (Remote Authentication Dial-In User Service) or DIAMETER server. The AAA server provides subscriber records for subscribers that identify, among other subscriber configuration requirements, to which context (e.g., which of the virtual routers) the corresponding subscribers should be bound within the edge network element. As used herein, a binding forms an association between a physical entity (e.g., port, channel, etc.) or a logical entity (e.g., interface, virtual circuit, etc.) with a higher-layer protocol interface over which network protocols (e.g., routing protocols, bridging protocols) are configured for a given context. Subscriber data flows on the physical entity when some higher-layer protocol interface is configured and associated with that physical entity. By way of a summary example, AAA processing is performed to identify the subscriber record for a subscriber, that subscriber record identifies one or more virtual routers in the edge network element to which that subscriber's traffic should be bound, and the physical entity carrying that subscriber's traffic (e.g., the circuit) is bound to an interface of that virtual router.

A Provider Edge (PE) network element is a type of edge network element situated at the edge of the provider's network. A Customer Edge (PE) network element is a type of edge network element located at the customer premise and typically communicates with PE network elements. In a Virtual Private LAN Service (VPLS) network, CE network elements typically attach, possibly through an access network (wired and/or wireless), to a VPLS instance (virtual bridge module) of a PE network element via an attachment circuit. The virtual bridge module of the PE network element attaches to an emulated Local Area Network (LAN) through an emulated LAN interface. For each VPLS service instance, there is an emulated LAN instance. The PE network elements are connected by pseudowires, which may be travelling over tunnels over a routed backbone. When a CE network element transmits a frame, the PE network element that receives the frame examines the MAC destination address field to determine how to forward the frame. Thus in this fashion, the PE network element functions as a layer 2 bridge. In addition, the PE network element functions as a virtual switch instance (VSI) by maintaining a forwarding table that maps MAC addresses to pseudowires and attachment circuits.

A method and apparatus for HVPLS hub connectivity failure recovery with dynamic spoke pseudowires is described. According to one embodiment of the invention, a provider edge network element that loses HVPLS hub connectivity reuses an HVPLS spoke connectivity failure recovery mechanism in an MTU to protect against that failure of HVPLS hub connectivity. The PE network element monitors hub facing connectivity elements and declares a hub connectivity failure upon a certain amount of those hub facing connectivity elements failing. The PE network element fabricates a failure of the spoke facing connectivity elements causing the MTU to detect an HVPLS spoke connectivity failure and switch to a secondary HVPLS spoke connection. In addition, after the transition to the secondary HVPLS spoke connection, the PE network element that lost its HVPLS hub establishes a dynamic spoke connection to that MTU to restore its connectivity to the HVPLS hub.

FIG. 1 is an exemplary data flow diagram illustrating reusing an HVPLS spoke recovery mechanism in an MTU to protect against a failure of HVPLS hub connectivity for network elements (e.g., customer edge network elements, other MTUs, etc.) connecting to the hub through the MTU and a PE network element establishing a dynamic HVPLS spoke connection to the MTU to restore its hub connectivity according to one embodiment of the invention. The operations of FIG. 1 will be described with reference to the exemplary embodiment of FIG. 2. However, it should be understood that the operations of FIG. 1 can be performed by embodiments of the invention other than those discussed with reference to FIG. 2, and the embodiments discussed with reference to FIG. 2 can perform differently than those discussed with reference to FIG. 1.

In FIG. 1, the HVPLS network 100 is illustrated. The HVPLS network 100 is divided into two tiers: a spoke tier and a hub tier. The hub tier includes the PE network elements 115, 120, and 125 coupled together in a full mesh (e.g., a full mesh of pseudowires for each VPLS instance). Thus, the PE network elements 115, 120, and 125 are hub network elements. The spoke tier includes the MTU 110 coupled to the HVPLS hub in a dual homed state (e.g., the MTU 110 is coupled with the PE network element 115 over the primary spoke connection 140A and is coupled with the PE network element 120 over the secondary spoke connection 140B) and the MTU 130. Thus, the PE network element 115 is the primary connection point to the HVPLS hub for the MTU 110, and the PE network element 120 is the secondary connection point to the HVPLS hub for the MTU 110. The MTU 110 is further coupled with the CE network elements 150 and 151 over the attachment connections (e.g., Ethernet link, ATM link, etc.) 170 and 171 respectively. The MTU 130 is coupled with the CE network elements 152 and 154 over the attachment connections 176 and 178 respectively. The PE network elements 115, 120, and 125 are coupled with the CE network elements 156, 159, and 158 over the attachment connections 172, 179, and 174 respectively. Thus, the following network elements are spoke network elements: the MTUs 110 and 130, and the CE network elements 150, 152, 154, 156, 158 and 159.

The PE network elements 115, 120, and 125, and the MTUs 110 and 130 include typical bridging functions and switching functions (e.g., MAC learning, packet replication, forwarding, etc.). Multiple VPLS instances may be implemented on a single PE network element or a single MTU (each VPLS instance is often called a "virtual bridge"). A different Forwarding Information Base (FIB) may exist for each separate VPLS instance. The CE network elements may be coupled directly with a PE network element (e.g., the CE network elements 156, 159, and 159 are coupled with the PE network elements 115, 120, and 125 respectively) or coupled with a MTU (e.g., the CE network element 150 is coupled with the MTU 110 and the CE network elements 152 and 154 are coupled with the MTU 130). Each attachment connection is associated with a VPLS instance (virtual bridge).

During normal operation, the MTU 110 communicates with the HVPLS hub via the PE network element 115 over the primary spoke connection 140A. During primary spoke connectivity failure (e.g., failure of the primary spoke connection 140A), the MTU transitions to communicating with the HVPLS hub via the PE network element 120 over the secondary spoke connection 140B. Similarly, during normal operation, the MTU 130 communicates with the HVPLS hub via the PE network element 115 over the spoke connection 142. It should be understood that the MTU 130 may also be dual homed in embodiments of the invention (e.g., the MTU 130 may be dual homed with the PE network element 125 or the PE network element 120). It should be understood that although not shown in FIG. 1 for simplicity purposes, one or more network elements (e.g., core network elements) may exist between the MTU 110 and the PE network elements 115 and/or 120.

According to one embodiment of the invention, the primary spoke connection 140A, the secondary spoke connection 140B, and the spoke connection 142 each include one or more spoke pseudowires (sometimes called virtual circuits). For example, a spoke pseudowire may exist for each VPLS instance. Similarly, in one embodiment of the invention the hub connections 160, 162, and 164 each include one or more hub pseudowires corresponding to the spoke pseudowires. In addition, a tunnel may be provisioned between the MTU 110 and each of the PE network elements 115 and 120 that carry the pseudowires of the spoke connections 140A and 140B. Similarly, a tunnel may be provisioned between the MTU 130 and the PE network element 115 and a tunnel may be provisioned between each of the PE network elements 115, 120, and 125 that carry the hub pseudowires of the hub connections 160, 162, and 164. For example, referring to FIG. 3, which is an exploded view of the HVPLS network 100 illustrated in FIG. 1 with an exemplary configuration, the primary spoke connection 140A and secondary spoke connection 140B include the spoke pseudowires 340A and 340B respectively and the spoke pseudowires 342A and 342B respectively. The spoke pseudowires 340A and 342A are each carried through the tunnel 310 and the spoke pseudowires 340B and 342B are each carried through the tunnel 316. Similarly, although not illustrated in FIG. 3, it should be understood that the spoke connection 142 may include one or more spoke pseudowires carried in a tunnel.

Figure 3:
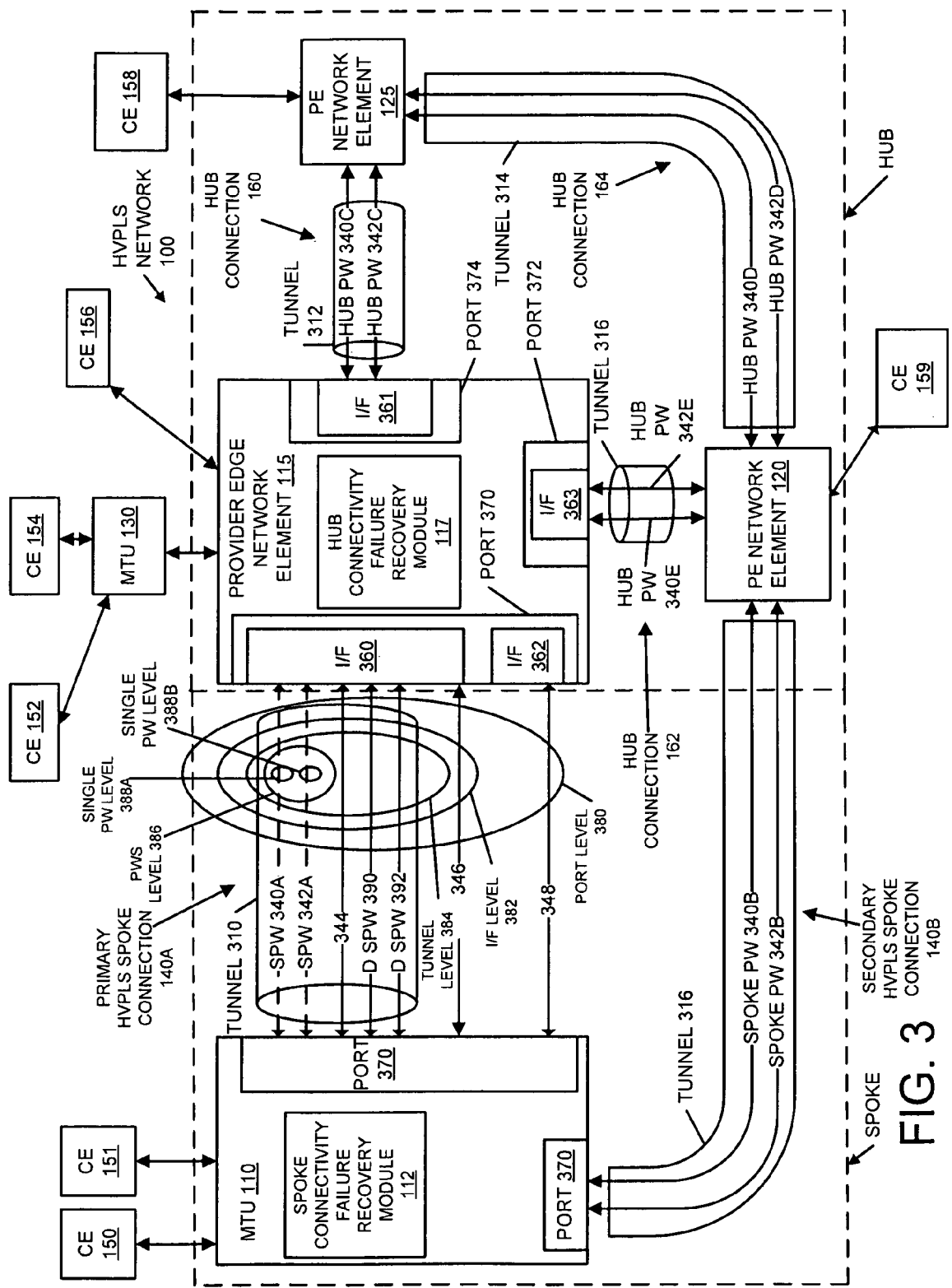
FIG. 3 illustrates an exploded view of the HVPLS network illustrated in FIG. 1 with an exemplary configuration, according to one embodiment of the invention.

The tunnel 310 also carries the non-HVPLS traffic 344 (e.g., traffic that is not transmitted through the HVPLS hub). Similarly, the hub connections 160, 164, and 162 include the hub pseudowires 340C-E respectively carried through encapsulation tunnels 312, 314, and 316 respectively. It should be understood that the non-HVPLS traffic 344 is not transmitted in the HVPLS hub. It should be understood that the configuration illustrated in FIG. 3 is exemplary, and thus there are many different possible configurations (e.g., the interfaces, tunnels, types of traffic, etc.).

The MTU 110 includes a mechanism to recover from an HVPLS spoke connectivity failure. For example, the MTU 110 includes the spoke connectivity failure recovery module 112 to detect and recover from a failure of HVPLS spoke connectivity. For example, the spoke connectivity failure recovery module detects whether the primary spoke connection 140A fails (e.g., the pseudowire failing, a tunnel carrying the pseudowire failing, the port carrying the interface failing, and/or the physical link failing, etc.) and causes a switchover to begin communicating with the HVPLS hub over the secondary spoke connection 140B. The PE network element 115 includes a hub connectivity failure recovery module 117, which will be described in greater detail with reference to FIG. 2.

Of course, it should be understood that the network topology illustrated in FIG. 1 is exemplary (e.g., the type and numbers of network elements), and different network topologies may be used in embodiments of the invention described herein. For example, multiple CE network elements and/or multiple MTUs may be coupled with the PE network elements 120 or 125.

Figure 2:
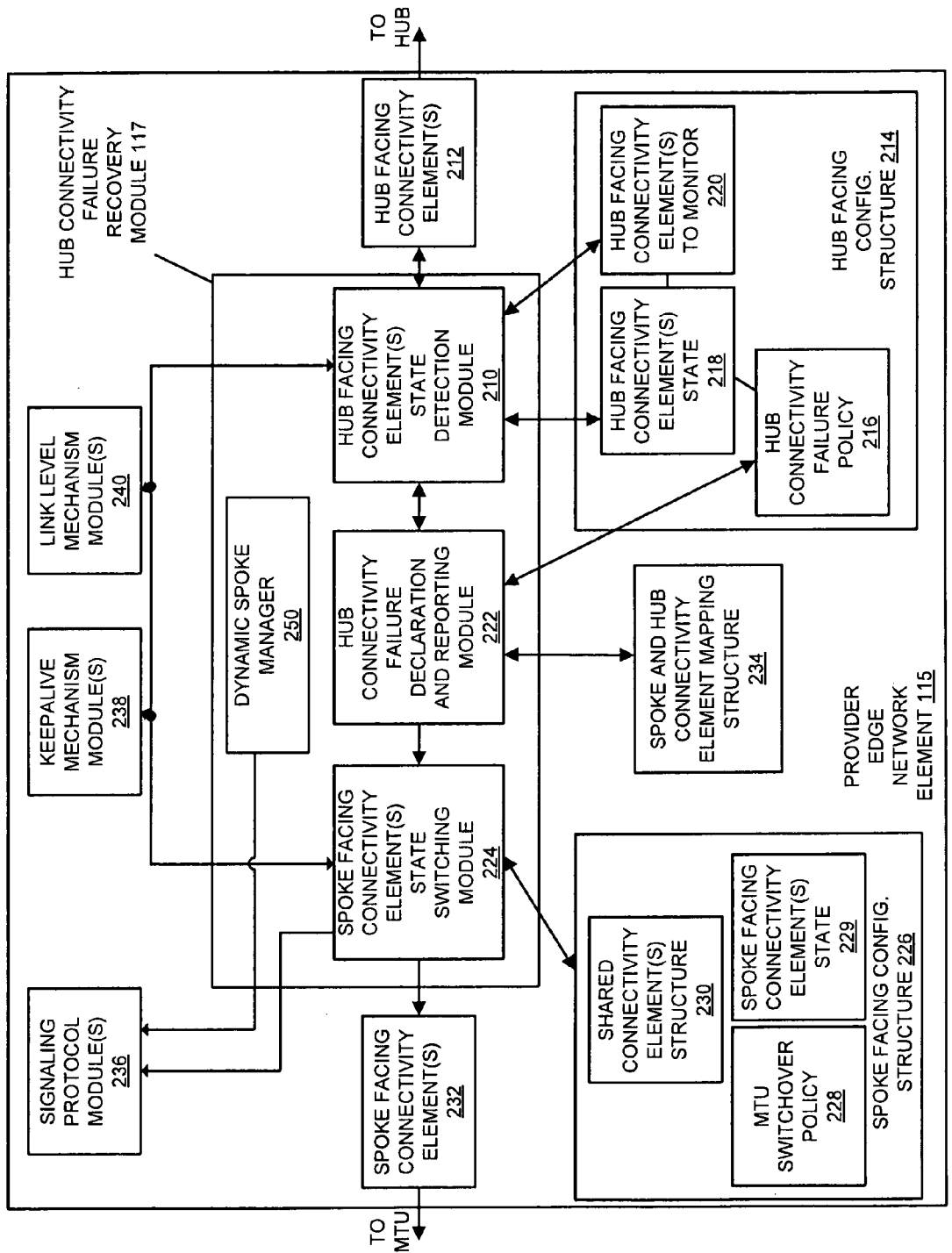
FIG. 2 illustrates an exemplary embodiment of a PE network element configured to restore its HVPLS hub connectivity upon detecting a failure of that hub connectivity according to one embodiment of the invention.

FIG. 2 illustrates an exemplary embodiment of the PE network element 115 configured to restore its HVPLS hub connectivity upon detecting a failure of that hub connectivity according to one embodiment of the invention. The PE network element 115 includes the hub connectivity failure recovery module 117, which is coupled with a spoke facing configuration structure 226 and a hub facing configuration structure 214. Also included in the PE network element 115 are one or more hub facing connectivity elements 212 and one or more spoke facing connectivity elements 232. Each hub facing connectivity element is a component (software or hardware component depending on the type of hub facing connectivity element) over which the PE element 115 communicates with other network elements in the HVPLS hub. Thus, the hub facing connectivity elements provide the hub connections to the other network elements in the HVPLS hub (e.g., the hub connections 160, 162, and 164). For example, hub facing connectivity elements are components over which the PE network element 115 communicates with the PE network elements 120 and 125 (e.g., pseudowire(s), tunnel(s) carrying the pseudowire(s), interface(s) carrying the tunnel(s), port(s), physical link, etc.). Similarly, a spoke facing connectivity element is a component (software or hardware component depending on the type of spoke facing connectivity element) which the PE network element 115 communicates with the MTU 110 and/or the MTU 130 (e.g., pseudowire(s), tunnel(s) carrying the pseudowire(s), interface(s) carrying the tunnel(s), port(s), physical link etc.).

In addition, the hub connectivity failure recovery module 117 may monitor the status of its next hops of the tunnels to the HVPLS hub if intermediate devices exist between the PE network element 115 and the other PE network elements in the hub. In the exemplary configuration of FIG. 3, the spoke facing connectivity elements of the PE network element 115 include the spoke pseudowires 340A and 342, the tunnel 310, the interfaces 360 and 362, and the port 370; while the hub facing connectivity elements of the PE network element 115 include the hub pseudowires 340C, 340E, 342C, and 342E, the tunnels 312 and 314, the interfaces 361 and 363, and the ports 374 and 372. It should be understood that there are spoke facing connectivity elements coupling the PE network element 115 with the MTU 130 and the CE network element 156, but they are not illustrated in order not to obscure understanding of the invention. In addition, it should be understood that the MTU 110, the MTU 130, and/or the CE 156 may share spoke facing connectivity element(s) (e.g., an interface, a port, etc.).

Thus, according to one embodiment of the invention, there are several levels of granularity of connectivity elements. For example, the lowest level of granularity is a pseudowire. The next level of granularity is a tunnel (multiple pseudowires may be carried in a single tunnel). Multiple tunnels may be configured on a single interface (thus an interface is the next level of granularity) and multiple interfaces may be bound to a single port (thus a port is the next level of granularity). It should be understood that if a higher level of granularity of connectivity element is in a failed state, each of the connectivity elements belonging to that failed connectivity element is also in a failed state. For example, referring to FIG. 3, if the interface 361 or the port 374 is determined to be in a failed state, the tunnel 312 and the hub pseudowires 340C and 342C will also inherently be in a failed state. However, the converse is not necessarily true (i.e., a lower level of granularity of connectivity element failing does not necessarily indicate that one of its higher level of granularity of connectivity element is also failed). For example, the hub pseudowire 340C may fail independently from the hub pseudowire 342C, the tunnel 312, the interface 361, and/or the port 374.

Referring back to FIG. 2, the hub facing configuration structure 214 includes a connectivity failure policy 216, a hub facing connectivity element(s) state 318, and a hub facing connectivity element(s) to monitor structure 220. Included within the spoke facing configuration structure 226 is a MTU switchover policy 228, a spoke facing connectivity element(s) state 229, and a shared connectivity element(s) structure 230. Included within the hub connectivity failure recovery module 117 is a hub facing connectivity element(s) state detection module 210, a hub connectivity failure declaration and reporting module 222, a spoke facing connectivity element(s) state switching module 224, and a dynamic spoke manager 250. Each of the above will be described in greater detail later herein.

Figure 4A:
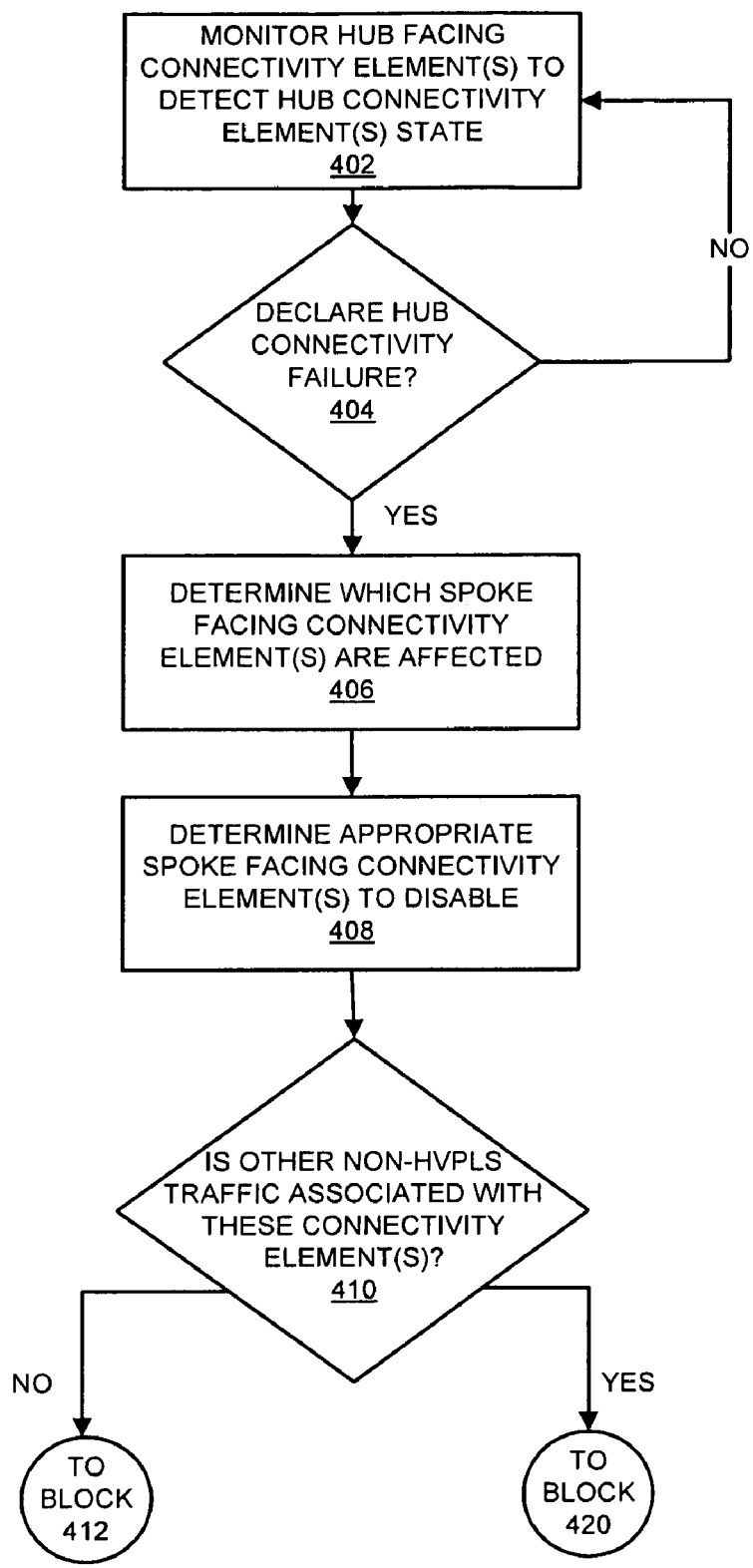
FIGS. 4A and 4B are exemplary flow diagrams illustrating protecting against a failure of HVPLS hub connectivity failure according to one embodiment of the invention.

Referring back to FIG. 1, at operation 1, the hub connectivity failure recovery module 117 declares a hub connectivity failure. While in one embodiment of the invention the hub connectivity failure recovery module 117 declares a hub connectivity failure upon each of its hub connections failing (e.g., the hub connections 160 and 162 each failing), in alternative embodiments of the invention the hub connectivity failure recovery module 117 declares a hub connectivity failure upon a different criteria (e.g., upon a certain amount of hub facing connectivity elements failing, etc.). The threshold amount of hub facing connectivity elements failing may be determined by a number of mechanisms, including a set policy or a configuration setting. With reference to FIGS. 2 and 4A, at block 402, the hub facing connectivity element(s) state detection module 210 monitors the hub facing connectivity element(s) to detect hub connectivity failure. Flow moves from block 402 to block 404. According to one embodiment of the invention, the hub facing connectivity element(s) state detection module monitors the ones of the hub facing connectivity element(s) 212 as indicated in the hub facing connectivity element(s) to monitor structure 220 to detect the state (e.g., operating or failed) of the monitored connectivity elements.

The hub facing connectivity element(s) may be monitored with numerous techniques. For example, if the hub facing connectivity element(s) that are being monitored is a pseudowire (e.g., hub pseudowires 340C, 342C, 340E, and/or 342E), that connectivity element may be monitored with use of operations and management (OAM) techniques such as virtual circuit connectivity verification (VCCV) (described in RFC 5085 "Pseudowire Virtual Circuit Connectivity Verification (VCCV): A Control Channel for Pseudowires", December 2007), connectivity fault management (CFM) messages (described in Institute of Electrical and Electronics Engineers (IEEE) standard 802.1ag, "Virtual Bridged Local Area Networks, Amendment 5: Connectivity Fault Management", Dec. 17, 2007), and/or other keepalive messages. For example, the hub facing connectivity element(s) state detection module may use the keepalive mechanism module(s) 238 to monitor the pseudowire connectivity elements. Tunnels (e.g., tunnel 312 and/or tunnel 314) may be monitored with connectivity verification techniques such as ping, MPLS ping, Bidirectional Forwarding Detection (BFD) messages, and/or other keepalive messages. Ports (e.g., port 374 and/or port 372) and/or interfaces (e.g., interface 361 and/or 363) may be monitored using mechanisms such as loss of signal, link aggregation control protocol (LACP) messages (e.g., by using the link level mechanism module(s) 240), and/or other keepalive messages.

It should be understood that the cause of the failure of a hub facing connectivity element may exist because of any number of reasons. The failure may occur due to something wrong on the PE network element 115 (e.g., configuration error, hardware failure, etc.) or something wrong on the other network elements in the HVPLS hub (e.g., PE 120 and/or PE 125). Additionally, the failure may occur between the hub elements (e.g., a physical link failure).

Referring back to FIG. 2, the hub facing connectivity element(s) state detection module 210 updates the hub facing connectivity element(s) state 218 for each monitored connectivity element (e.g., operating or failed, up or down, etc.). According to one embodiment of the invention, a hub connectivity failure is declared by the hub connectivity failure declaration and reporting module 222 if a certain amount of hub facing connectivity element(s) fail. According to one embodiment of the invention the hub connectivity failure policy 216 includes the threshold for declaring a hub connectivity failure (e.g., one connectivity element failed (e.g., a single pseudowire failed), 50 percent failed, 100 percent, a tunnel connectivity element failed, etc.). According to one embodiment of the invention, a network administrator determines the threshold for declaring a hub connectivity failure and configures this as the hub connectivity failure policy 216.

Thus, referring to FIG. 4A, at block 404, the hub facing connectivity failure declaration and reporting module 222 determines whether to declare hub connectivity failure. If hub connectivity failure is not declared, control flows back to block 402. If hub connectivity failure is declared, control flows to block 406. Referring back to FIG. 1, sometime after the hub connectivity failure of 130A and 130B, at an operation 2, the hub connectivity failure recovery module 117 declares a hub connectivity failure 132.

Sometime after declaring the hub connectivity failure, at block 406 of FIG. 4A, the hub connectivity failure recovery module 117 determines which spoke facing connectivity element(s) are affected by the hub connectivity failure. For example, referring to FIG. 2, the spoke and hub connectivity element mapping structure 234 includes information associating hub connectivity element(s) with spoke connectivity element(s). According to one embodiment of the invention, the hub connectivity failure detection and reporting module 222 determines, through use of the spoke and hub connectivity element mapping structure 234, which spoke facing connectivity element(s) are affected by the hub connectivity failure. Sometime after the affected spoke facing connectivity element(s) are determined, the hub connectivity failure detection and reporting module 222 passes this information to the spoke facing connectivity element(s) state switching module 224. It should be understood that in certain cases, for each spoke facing pseudowire connectivity element that is affected by the hub connectivity failure, the MTU does not have access to the HVPLS hub for those pseudowires (i.e., the pair of CE network elements that are to be connected with the affected pseudowire will not be able to communicate with each other through the HVPLS hub). Thus, the MTU is isolated from the HVPLS hub for those affected pseudowires. Additionally, in one embodiment of the invention the hub connectivity failure affects CE network elements coupled to the PE network element directly through an attachment connection. For example, the hub connectivity failure declared by the PE network element 115 may affect the CE network element 156.

In addition, an MTU does not detect the status of HVPLS hub connectivity (i.e., the MTU does not have visibility into the HVPLS hub besides the primary termination point(s) (e.g., termination point for each spoke pseudowire at the PE network element 115) or the secondary termination point(s) (e.g., termination point for each secondary spoke pseudowire at the PE network element 120). Thus, the MTU 110 and the MTU 130 do not detect whether the PE network element 115 can access the HVPLS hub (i.e., whether the hub pseudowires connecting the PE network element 115 (e.g., hub pseudowires 340C, 342C, 340E, and/or 342E) with the other PE network elements have failed). If an MTU detects an operable spoke connection (e.g., the pseudowire is operable and the primary termination point is operable) the MTU assumes that everything is working correctly. However, as illustrated in FIG. 1, it is possible that the MTU 110 may be able access the primary connection point to the HVPLS hub (PE network element 115) via the primary spoke connection 140A yet not be able to access the other HVPLS hub network elements (e.g., PE network elements 120 and/or 125) as the primary connection point to the HVPLS hub has lost its hub connectivity. Thus, in this case, the CE network elements 150, 152, 154, and 156 would not able to communicate with the other CE network elements attached to the HVPLS hub via the HVPLS network 100. Since the MTU 110 is not aware of a lack of connectivity to the HVPLS hub due to the loss of connections by the primary PE, the MTU 110 is not aware to switch to the PE network element designated as its secondary connection point to the HVPLS hub. Thus, in a typical implementation of a MTU in a typical HVPLS network, if the HVPLS hub connectivity has failed (e.g., HVPLS hub connections have failed) yet the spoke connection is operating, the MTU will not able to communicate with the HVPLS hub and will not be aware to use its dual-homed spoke connectivity failure recovery mechanism to switch to the secondary spoke connection.

Referring back to FIG. 4A, sometime after determining which spoke facing connectivity element(s) are affected by the hub connectivity failure, the hub connectivity failure recovery module 117 determines appropriate spoke facing connectivity element(s) to disable, at an operation 408. According to one embodiment of the invention, the spoke facing connectivity element(s) state switching module 224 determines which spoke facing connectivity element(s) to disable based on the MTU switchover policy 228. If there are multiple MTUs which are affected by the hub connectivity failure, in one embodiment of the invention the spoke facing connectivity element(s) state switching module 224 selects the spoke facing connectivity elements affecting a single MTU (preferably an MTU that is dual-homed). For example, with reference to FIG. 1, the MTU 110 is dual homed while the MTU 130 is not dual homed. Therefore, the spoke facing connectivity element(s) state switching module 224 determines to disable the spoke facing connectivity element(s) of the MTU 110. Disabling a spoke facing connectivity element(s) 232 effectively fabricates a failure of that connectivity element with the intention that the MTU 110 will detect this fabricated failure and treat it as a real failure. Thus, for example, the hub connectivity failure recovery module 117 may fabricate a failing of a spoke facing port connectivity element by disabling that port, which is described in greater detail later herein.

Similarly to the hub facing connectivity elements, there are several levels of granularity of spoke facing connectivity elements (e.g., pseudowire, tunnel, interface, port). The MTU switchover policy 228 may indicate at which granularity level to disable. For example, referring to FIG. 3, the single pseudowire level 388A and 388B each belong to a single pseudowire (e.g., the spoke pseudowire 340A and the spoke pseudowire 342A respectively) and may each be separately disabled (e.g., if the failure of hub connectivity affects only one of the spoke pseudowires, that pseudowire may be individually disabled). The pseudowires level 386 includes both of the spoke pseudowires (e.g., spoke pseudowires 388A and 388B). The tunnel level 384 includes both of the spoke pseudowires (e.g., spoke pseudowires 388A and 388B) and other traffic carried on that tunnel (e.g., non-HVPLS traffic link 344). The interface level 382 includes the tunnel level 384 (and inherently any levels encompassed by the tunnel level 384) and any other traffic carried on that interface (e.g., the non-HVPLS traffic link 346). The port level 380 includes the interface level 382 (and inherently any levels encompassed by the interface level 382 and below). In addition, the hub connectivity failure recovery module 117 may disable the next hops of the tunnels to the MTU 110 if an intermediate device exists between the PE network element 115 and the MTU 110.

It should be understood that if the hub connectivity failure recovery module 117 disables a spoke facing connectivity element, all traffic using that particular spoke facing connectivity element will be interrupted, regardless whether the traffic is HVPLS traffic and/or non-HVPLS traffic, and regardless of whether that spoke facing connectivity element is shared between multiple hub network elements. For example, if the hub connectivity failure recover module 117 disables the port 370, inherently all the traffic received at the port 370 will be interrupted (e.g., non-HVPLS traffic 348 sent by the MTU 110 (through port 364) to the interface 362, traffic sent on the spoke pseudowires 340A and 342A sent from the MTU 110 (through port 364) the interface 360 over the tunnel 310, and non-HVPLS traffic 344 and 346). Similarly, if the hub connectivity failure reporting module 117 disables the interface 360, all the traffic received at that interface will be interrupted (e.g., the spoke pseudowires 340A and 342A, and the non-HVPLS traffic 344 and 346). Similarly, if the hub connectivity failure reporting module 117 disables the tunnel 310, all the traffic transmitted over that tunnel will be interrupted (e.g., the spoke pseudowires 340A and 342A, and non-HVPLS traffic 344).

According to one embodiment of the invention, the level of granularity of connectivity element to disable is based upon the MTU switchover policy 228. According to one embodiment of the invention, a network administrator configures the information in the MTU switchover policy 228 (e.g., which level of granularity of connectivity element to disable). It should be understood that a network administrator may choose to disable a higher level of granularity of connectivity element than is necessary (i.e., more than the individual pseudowires that are affected by the hub connectivity failure) for scalability purposes. For example, since disabling a higher level of granularity of spoke facing connectivity element inherently disables its lower level of granularity of spoke facing connectivity elements, the affected pseudowires are disabled more quickly than if they were each individually disabled. However, since disabling a higher level of granularity of connectivity element may have the undesirable effect that non-HVPLS traffic and/or services unaffected by the hub connectivity failure may be interrupted by that disablement, the hub connectivity failure recovery module 117 limits the amount of interruption. For example, referring back to FIG. 4A, at block 410 the hub connectivity failure recovery module 117 determines if other non-HVPLS traffic is associated with the connectivity element(s) that are chosen to be disabled (i.e., whether non-HVPLS traffic will be affected if those connectivity element(s) are disabled). If non-HVPLS traffic will be affected, flow moves to block 420. If no non-HVPLS traffic will be affected if those connectivity element(s) are disabled, flow moves to the block 412. According to one embodiment of the invention, for each connectivity element that is to be disabled, the spoke facing connectivity element(s) state switching module 224 determines whether any non-HVPLS traffic will be affected through use of the shared connectivity element(s) structure 230. Thus, the shared connectivity element(s) structure 230 includes information indicating whether, and which other connection links, share a connectivity element with a HVPLS connectivity element. According to another embodiment of the invention, the spoke facing connectivity element(s) state switching module 224 assumes that each spoke facing connectivity element, with the exception of spoke facing pseudowire connectivity elements, may share a connection with non-HVPLS traffic. According to another embodiment of the invention, the spoke facing connectivity element(s) state switching module 224 assumes that each spoke facing connectivity element, with the exception of spoke facing pseudowire connectivity elements and spoke facing tunnel connectivity elements, may share a connection with non-HVPLS traffic.

Figure 4B:
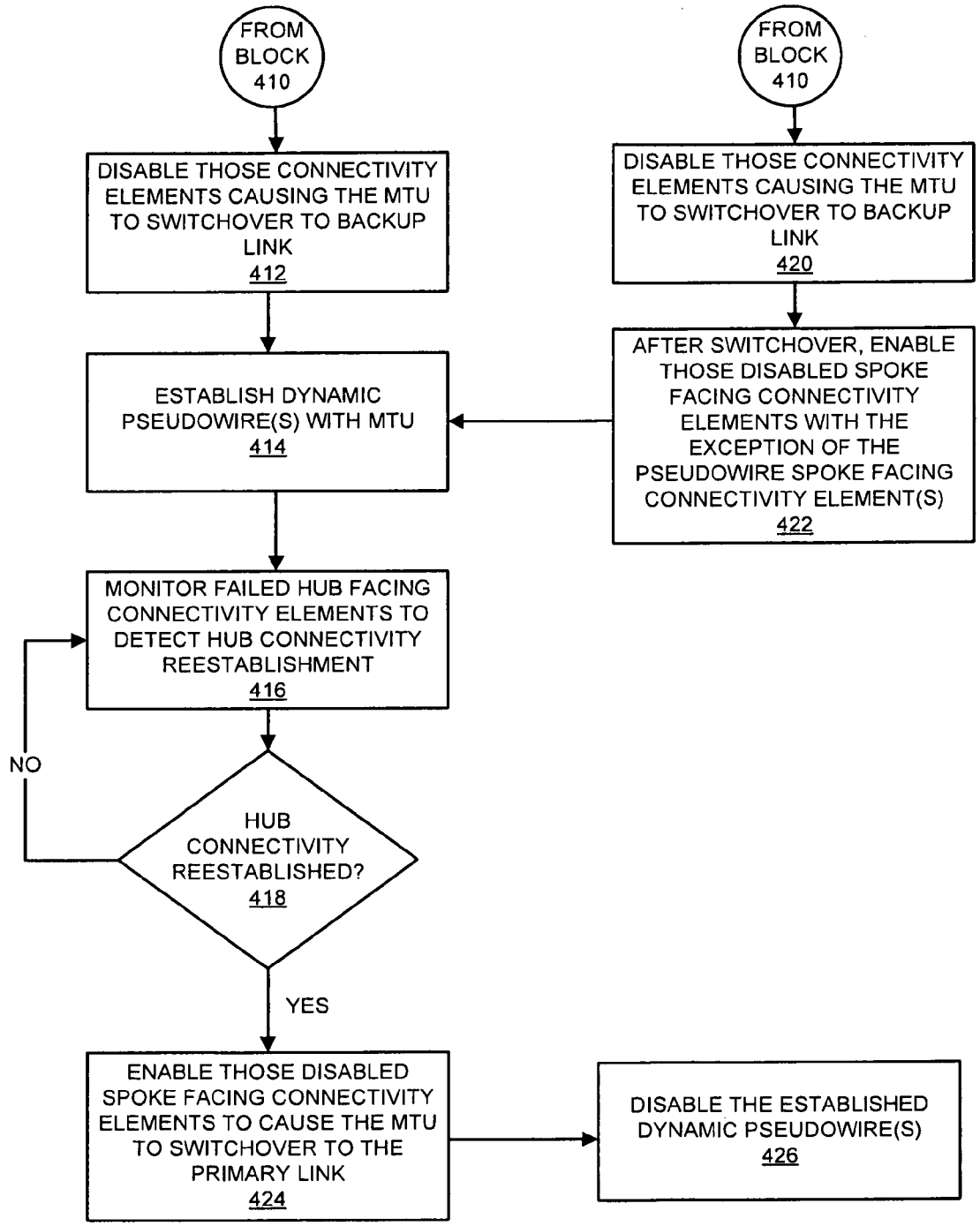

Referring to FIG. 4B, at block 412, those spoke facing connectivity element(s) 232 that were selected to be disabled (e.g., in block 408) are disabled by the hub connectivity failure recovery module. For example, referring to FIG. 1, the spoke facing connectivity element(s) 134 terminating the primary spoke connection 140A are disabled. Similarly, at block 412, those spoke facing connectivity element(s) 232 that were selected to be disabled (e.g., in block 408) are disabled by the hub connectivity failure recovery module. For example, referring to FIG. 1, the spoke facing connectivity element(s) 134 terminating the primary spoke connection 140A are disabled.

The hub connectivity failure recovery module 117 may disable the spoke facing connectivity elements 232 to fabricate a failure of those connectivity elements in numerous ways, actively and/or passively, depending on connectivity element type (e.g., actively through use of signaling protocols (e.g., Label Distribution Protocol (LDP), Resource Reservation Protocol (RSVP), passively through keepalive mechanisms (e.g., BFD, ping, MPLS ping, etc.) and/or through link loss mechanisms (e.g., LOS, LACP), etc.). For example, the hub connectivity failure recovery module 117 may fabricate a failure of a spoke facing pseudowire connectivity element through signaling the MTU 110 (e.g., through the signaling protocol module(s) 236) that the pseudowire identifier (PWID, which is a globally unique identifier in the HVPLS network 100 that identifies a particular pseudowire) corresponding to the spoke facing pseudowire connectivity element is down. According to one embodiment of the invention, the spoke facing connectivity element(s) state switching module 224 changes the state of the spoke facing pseudowire connectivity element that is to be disabled to a state of down in the spoke facing connectivity element(s) state structure 229. Additionally, the spoke facing connectivity element(s) state switching module 224 notifies the signaling protocol module(s) 236 to signal the MTU indicating the spoke pseudowire is down (i.e., to fabricate the failure of the spoke pseudowire). For example, referring to FIG. 3, the PE network element 115 may signal the MTU 110 indicating the spoke pseudowire 340A and/or 342A are down.

According to one embodiment of the invention, the hub connectivity failure recovery module 117 may actively fabricate a failure of a spoke facing tunnel connectivity element (e.g., the tunnel 310) through signaling the MTU 110 indicating the tunnel is down in a similar fashion as was described for fabricating failure of spoke facing pseudowire connectivity elements. According to one embodiment of the invention, the hub connectivity failure recovery module 117 may passively fabricate a failure of a spoke facing tunnel connectivity element by temporarily suspending transmission of keepalive messages (e.g., BFD, ping, MPLS ping) associated with that tunnel. Of course, it should be understood that the particular keepalive mechanism selected must be understandable by the MTU 110 (i.e., the MTU 100 must be monitoring that tunnel through that particular keepalive mechanism). For example, after determining to disable a spoke facing tunnel connectivity element (e.g., for the tunnel 310) the spoke facing connectivity element(s) state switching module 224 changes the state of that tunnel to a state of down in the spoke facing connectivity element(s) state structure 229. As long as that spoke facing tunnel connectivity element has a state of down, (e.g., as indicated in the spoke facing connectivity element(s) state structure 229), the keepalive mechanism module(s) does not transmit keepalive messages for that spoke facing tunnel connectivity element. In one embodiment of the invention, the MTU 110 assumes that the tunnel is down if it does not receive a keepalive message associated with that tunnel for a specified period of time (e.g., the MTU 110 does not receive a response to a keepalive message it transmits for 3 consecutive attempts). It should be understood that if the MTU 110 assumes the tunnel is down, the MTU 110 inherently assumes that all of the traffic carried on that tunnel (primary spoke pseudowires and/or non-HVPLS traffic) is also down. For example, the MTU 110 assumes that the spoke pseudowires 340A and 342A and non-HVPLS traffic 344 are down if it does not receive a keepalive mechanism for the tunnel 310.

In the case that a spoke facing interface connectivity element is to be disabled (e.g., the interface 360), the spoke facing connectivity element(s) state switching module changes the state of that interface connectivity element to a state of down in the spoke facing connectivity element(s) state structure 229. As long as that interface has a state of down, the tunnels associated with that interface and the pseudowires carried on those tunnels also have a state of down. Thus, in one embodiment of the invention, the spoke facing connectivity element(s) state switching module changes the states of each connectivity element belonging to that spoke facing interface connectivity element to a state of down, and the hub connectivity failure recovery module 117 disables each of those connectivity elements in a similar fashion as described previously (e.g., through use of the signaling protocol module(s) 236 and/or temporarily disabling the keepalive mechanism module(s) 238 from transmitting keepalive messages to the MTU 110). Of course it should be understood that as long as a spoke facing interface connectivity element has a state of down, no traffic (e.g., HVPLS traffic and/or non-HVPLS traffic) may be received for that interface.

According to one embodiment of the invention, the hub connectivity failure recovery module 117 may passively fabricate a failure of a spoke facing port connectivity element by temporarily suspending transmission of link level messages (e.g., through use of the link level mechanism module(s) 240 (e.g., LOS, LACP)) associated with that port. As long as that port connectivity element has a state of down, the spoke facing interfaces bound to that port, the tunnels associated with those interfaces, and the pseudowires carried on those tunnels, also have a state of down (thus are also disabled). Thus, as long as the port connectivity element has a state of down, all traffic (e.g., HVPLS and non-HVPLS traffic) arriving (or exiting) that port will be interrupted.

According to one embodiment of the invention, regardless of the method chosen to disable the appropriate connectivity element, in order for the MTU 110 to switch to secondary spoke pseudowires, at a minimum the MTU must be able to detect the change of state of the spoke pseudowires.

Referring back to FIG. 1, at operation 4, the spoke connectivity failure recovery module 112 detects a failure of the primary spoke connectivity 136 due to the fabricated failure of the primary spoke connection 140A (the dotted line of the primary spoke connection 140A indicates a fabricated failure). The spoke connectivity failure recovery module 112 performs an HVPLS spoke recovery mechanism to switch to the secondary spoke connection 138 at operation 5. Thus, the MTU 110 has access to the HVPLS hub through the secondary spoke connection 140B and the PE network element 120. Thus, after the transition, the hub connectivity for the CE network elements 150 and 151 is restored.

According to one embodiment of the invention, the PE network element 115 may fabricate any number of the spoke facing connectivity elements 232. The MTU 110, in response to the fabricated failure(s), switches only those spoke pseudowires which are affected by the fabricated failure. For example, the MTU 110 switches to the secondary spoke pseudowire 340B upon detecting the fabricated failure of the primary spoke pseudowire 340A. The primary spoke pseudowire 342A may be unaffected by the fabricated failure and thus may not be switched to the secondary spoke pseudowire 342B. However, as another example, the MTU switches to the secondary spoke pseudowires 340B and 342B upon detecting the fabricated failure of the tunnel 310, since a failure of the tunnel 310 affects both of the primary spoke pseudowires 340A and 342A.

Since fabricating a failure of a spoke facing connectivity element at a higher granularity level than a pseudowire connectivity element (e.g., tunnel, interface, port) may negatively affect non-HVPLS traffic (e.g., non-HVPLS traffic cannot use that connectivity element when it is disabled), according to one embodiment of the invention, the hub connectivity failure recovery module 117 re-enables those disabled spoke facing connectivity elements, with the exception of the spoke facing pseudowire connectivity elements, at a point in time after which it is expected that the MTU will or has switched to the secondary spoke connection (block 422). According to another embodiment of the invention, the hub connectivity failure recovery module 117 re-enables those disabled spoke facing connectivity elements, with the exception of the spoke facing pseudowire connectivity elements, soon after the spoke facing pseudowire connectivity elements are disabled (e.g., the hub connectivity failure recovery module 117 may toggle a spoke facing tunnel connectivity element (i.e., bring down and quickly bring up) while keeping all of the spoke facing pseudowire connectivity elements associated with that tunnel in a disabled state). According to another embodiment of the invention, the hub connectivity failure recovery module 117 re-enables only those disabled spoke facing connectivity elements which may carry non-HVPLS traffic (e.g., the hub connectivity failure recovery module 117 may keep a spoke facing tunnel connectivity element in a disabled state if that tunnel carries only HVPLS traffic (i.e., only carries spoke pseudowires)). For example, referring to FIG. 3, if the spoke facing connectivity element for the interface 360 was disabled (e.g., the state of the interface 360 is marked as down), the hub connectivity failure recovery module 117 re-enables that interface (e.g., the spoke facing connectivity element(s) state switching module 224 changes the state of the interface 360 to up) to allow the non-HVPLS traffic 346 to continue to be received at the interface 360. Thus, while connectivity to the HVPLS hub is failed through the primary connection point (e.g., the PE network element 115), the affected primary spoke pseudowires are switched to the secondary spoke pseudowires allowing the MTU 110 to connect with the HVPLS hub through the secondary connection point (e.g., the PE network element 120) and non-HVPLS traffic may continue to use any temporarily disabled hub connectivity elements (e.g., tunnel, interface, port) after a brief interruption of service.

Thus, it should be understood that after the MTU 110 transitions to the secondary spoke connection 140B, the MTU 110 restores its connection to the HVPLS hub (via the PE network element 120). Therefore, the CE network elements 150 and 151 have access to the HVPLS hub. If the MTU 130 is dual homed, a similar mechanism may be used to restore the hub connectivity to the MTU 130. However, if the MTU 130 is not dual homed, or its transition fails, the MTU 130 (and thus the CE network elements 152 and 154) will not have connectivity to the hub. In addition, it should be understood that even if the MTU 130 restores its connectivity to the HVPLS hub, the CE network element 156 does not have connectivity to the hub.

For the purposes of the following description, it is assumed that the MTU 130 and the CE network element 156 have each lost their connectivity to the HVPLS hub due to the hub connectivity failure experienced at the PE network element 115, and neither has an independent mechanism to restore their hub connectivity. For example, the MTU 130 is not dual-homed. Therefore, the PE network element 115 does not, to the extent possible, disable the spoke facing connectivity elements coupling the MTU 130 and/or the CE 156. For example, as described above, in one embodiment of the invention the PE network element 115 re-enables each disabled spoke facing connectivity element with the exception of the disabled spoke pseudowires. Thus, any shared spoke facing connectivity element(s) between the MTU 110 and the MTU 130 and/or the CE 156 (e.g., an interface, port, etc.) will be disabled for only a short period of time.

In order to restore the hub connectivity for the MTU 130 and/or the CE network element 156, the PE network element 115 establishes a new spoke connection to the MTU 110. Traffic transmitted by the MTU 130 and the CE network element 156 destined for the HVPLS hub is forwarded over the new spoke connection to the MTU 110, which in turn forwards that traffic over the secondary spoke connection 140B towards the PE network element 120. It should be understood that the MTU 130 and/or the CE network element 156 cannot use the primary spoke connection 140A as it has been disabled by the hub connectivity failure recovery module 117. If the hub connectivity failure recovery module 117 re-enabled the primary spoke connection 140A (which will be described in greater detail later herein), it should be understood that the MTU 110 transitions back to the primary spoke connection 140A irrespective of whether the HVPLS hub connectivity has been restored.

Thus, at operation 6, the hub connectivity failure recovery module 117 establishes a dynamic spoke connection with the MTU 110. For example, with reference to FIG. 2, the dynamic spoke manager 250 establishes the dynamic spoke connection 144 with the MTU 110. According to one embodiment of the invention, the dynamic spoke connection 144 includes a number of pseudowires corresponding to the amount of VPLS instances affected by the hub connectivity failure. For example, with reference to FIG. 3, the hub connectivity failure recovery module 117 establishes the dynamic spoke pseudowires 390 and 392 that correspond with the disabled spoke pseudowires 340A and 342A respectively. The dynamic spoke pseudowires may be established using any known methods, including using a signaling protocol from one of the one or more signaling protocol modules 236 (e.g., using Label Distribution Protocol (LDP) or Border Gateway Protocol (BGP), etc.) and/or a static configuration. After the dynamic spoke connection 144 is established, the MTU 110 begins learning MAC addresses on the dynamic spoke connection 144 (e.g., for each of the one or more pseudowires within the dynamic spoke connection 144). According to one embodiment of the invention, for each VPLS instance, the MTU 110 transmits a flush message to the other participating PE network elements (e.g., the PE network elements 120 and 125) indicating that they should flush MAC addresses learned from the PE network element 115. Therefore, traffic from the MTU 130 (from the CE network element 152 and/or the CE network element 154) and the CE network element 156 may be forwarded by the PE network element over the dynamic spoke connection 144. In addition, traffic from the HVPLS hub destined for the CE network elements 152, 154, and 156 is transmitted to the MTU 110 (e.g., over the secondary spoke connection 140B) which transmits the traffic to the PE network element 115 (e.g., over the dynamic spoke connection 144), which transmits the traffic to traffic to the MTU 130 and/or the CE network element 156.

It should be understood that the hub connectivity failure recovery module 117 may be coupled with multiple MTUs. In one embodiment of the invention, the PE network element 115 may select one of those multiple MTUs to establish the dynamic spoke connection with (e.g., the selection may be random or according to a policy). In an alternative embodiment of the invention, the hub connectivity failure recovery module 117 may establish a dynamic spoke connection with each of the multiple MTUs, and use a loop removal algorithm (e.g., Spanning Tree Protocol (STP)) to prevent loops. In some embodiments of the invention a PE network element establishes a dynamic spoke connection with only those MTUs which have transitioned to a secondary spoke connection thus avoiding using a loop removal algorithm.

In some embodiments of the invention, prior to fabricating the failure of the spoke facing connectivity elements towards a particular MTU, the PE network element determines whether that MTU is configured with a secondary spoke connection (and thus can transition to that secondary spoke connection). For example, in one embodiment of the invention, the PE network element transmits a message to each coupled MTU requesting indication whether they support a secondary spoke connection (e.g., whether they are dual-homed). The PE network element selects which set of spoke connectivity elements to disable based on the messages received back from the MTU. For example, in FIG. 1, the MTU 110 is dual-homed, but the MTU 130 is not dual homed (thus, the MTU 110 supports a secondary spoke connection while the MTU 130 does not support a secondary spoke connection). Thus, the PE network element 115 fabricates those spoke facing connectivity elements coupling the MTU 110 and limits the amount of disruption of the spoke facing connectivity elements coupling the MTU 130 (e.g., as described above, the PE network element 115 enables each disabled spoke facing connectivity elements with the exception of the disabled spoke pseudowires). In addition, in some embodiments of the invention, the MTU that was selected to transition to its secondary spoke connection transmits a message to the PE network element indicating whether the transition was successful. If the transition was not successful, the PE network element may select another MTU to transition to its secondary spoke connection (if another MTU exists).

In some embodiments of the invention, after establishing the dynamic spoke connection (e.g., the dynamic spoke connection 144), the PE network element 115 determines whether the transition to the secondary spoke connection (e.g., to the secondary spoke connection 140B) was successful. For example, in one embodiment of the invention, the PE network element 115 receives an indication from the MTU 110 whether the transition was successful. In an alternative embodiment of the invention, the provider edge network element transmits a keep-alive message (e.g., a ping message) to any of the other PE network elements in the hub (e.g., the PE network element 120) over the dynamic spoke connection 144. If the other PE network does not respond after a given amount of tries, the PE network element 115 assumes that the transition failed. If the transition failed, in one embodiment of the invention the dynamic spoke connection is removed, the disabled spoke facing connectivity elements are re-enabled, and a different MTU (if available) is selected for recovery purposes (e.g., flow moves back to block 408).

Thus, with reference to FIG. 4B, at block 414, the hub connectivity failure recovery module 117 establishes one or more dynamic pseudowires with the MTU 110. Flow moves from block 414 to block 416. Thus, it should be understood that after the dynamic spoke connection 144 is established, the hub connectivity for the MTU 130 (and thus the CE network elements 152 and 154) and the CE network element 156 is restored.

At block 416, the hub connectivity failure recovery module 117 monitors the failed hub facing connectivity elements to detect hub connectivity reestablishment. For example, the hub facing connectivity element(s) state detection module 210 monitors those hub facing connectivity element(s) 212 which are in a failed state as indicated in the hub facing connectivity element(s) state 218. The mechanisms to monitor the failed hub facing connectivity elements are similar as described previously in reference to monitoring for a failure of the hub facing connectivity elements 212. The hub facing connectivity element(s) state detection module further changes the state of each re-enabled hub facing connectivity element to operating upon detecting reestablishment of that connectivity element. At block 418, the hub connectivity failure recovery module 117 determines if hub connectivity has been reestablished. According to one embodiment of the invention, the hub connectivity failure recovery module 117 waits a certain amount of time (e.g., a hold down time period) after detecting the reestablishment of the previously failed hub facing connectivity elements to determine that the hub facing connectivity elements are stable before declaring hub connectivity has been reestablished (e.g., to protect against a hub facing connectivity element flapping (i.e., quickly going down and quickly coming back up)). For example, if the previously failed hub facing connectivity element(s) stays stable during the entire hold down time period, the hub connectivity failure recovery module 117 declares that hub connectivity has been reestablished (and thus the disabled spoke facing connectivity elements may be re-enabled). If the previously failed hub facing connectivity element(s) does not stay stable (e.g., fails) during the hold down time period, the hold down time period is restarted.

If hub connectivity has been reestablished, control moves to block 424. At block 424, the hub connectivity failure recovery module 117 enables those disabled spoke facing connectivity elements to cause the MTU to switch back to the primary spoke connection. According to one embodiment of the invention, the spoke facing connectivity element(s) state switching module 224 changes the state of each disabled spoke facing connectivity element to up, and ends the fabricated failure of those connectivity elements (e.g., the PE network element 115 resumes transmitting OAM messages for those re-enabled connectivity elements). Flow moves from block 424 to block 426. At block 426, sometime after the disabled spoke facing connectivity elements have been enabled, the hub connectivity failure recovery module 117 disables the dynamic spoke connection 144, and the HVPLS network 100 functions as it was before the hub connectivity failure.

According to one embodiment of the invention, the PE network element 115 includes one or more contexts. For example, the PE network element 115 may include a separate Virtual Private Local Area Network (VPLAN) context for each VPLS service instance. Each VPLAN context may be associated with multiple ports (both ingress and egress ports). In addition, the VPLAN contexts may share ports. However, each VPLAN context includes its own management domain, AAA name space, IP address, and routing database(es). For example, the PE network element 115 may include a VPLAN context (VPLAN context A) associated with a VPLS instance A (e.g., including the CE network elements 151, 152, 154, and 159) and a VPLAN context (VPLAN context B) associated with a VPLS instance B (e.g., including the CE network elements 150, 156, and 158).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a first one of a plurality of hierarchical virtual private LAN service (HVPLS) hub network elements to recover from a failure of HVPLS hub connectivity on behalf of at least some of a plurality of spoke network elements coupled with the first HVPLS hub network element, wherein the first HVPLS hub network element provides HVPLS hub connectivity to those spoke network elements, wherein the plurality of spoke network elements includes a first set of one or more spoke network elements including a multi-tenant unit (MTU) coupled with the first HVPLS hub network element by a first HVPLS spoke connection and a second set of one or more spoke network elements coupled with the first HVPLS hub network element, wherein the first HVPLS hub network element is also coupled with each of the other of the plurality of HVPLS hub network elements with a hub connection, the method comprising:

monitoring for a failure of the HVPLS hub connectivity of the first HVPLS hub network element through a plurality of HVPLS hub facing connectivity elements of the first HVPLS hub network element, wherein the plurality of HVPLS hub facing connectivity elements provide hub connections to the others of the plurality of HVPLS hub network elements;

detecting the failure of the HVPLS hub connectivity of the first HVPLS hub network element;

fabricating a failure of the first HVPLS spoke connection by disabling within the first HVPLS hub network element one or more HVPLS spoke facing connectivity elements supporting the first HVPLS spoke connection, wherein a HVPLS spoke recovery mechanism in the MTU will react to the fabricated failure of the first HVPLS spoke connection by transitioning to a second HVPLS spoke connection that couples the MTU to a second of the plurality of HVPLS hub network elements that is designated as a secondary connection point to the HPVLS hub for the MTU; and the first HVPLS hub network element establishing a third HVPLS spoke connection to the MTU to restore HVPLS hub connectivity to the second set of spoke network elements coupled with the first HVPLS hub network element.

2. The method of claim 1, further comprising the first HVPLS hub network element transmitting traffic received from the second set of spoke network elements destined for the HVPLS hub to the MTU which in turn transmits the traffic to the second HVPLS hub network element over the second HVPLS spoke connection.

3. The method of claim 1, wherein the second set of spoke network elements includes an MTU coupled with the first HVPLS hub network element and a first set of one or more customer edge network elements coupled with that MTU, the second set of spoke network elements further including a second set of one or more customer edge network elements directly coupled with the first HVPLS hub network element over one or more attachment connections respectively.

4. The method of claim 1, further comprising:

the HVPLS hub network element monitoring for a reestablishment of its HVPLS hub connectivity; and upon detecting the reestablishment of the HVPLS hub connectivity, performing the following:

reenabling each disabled spoke facing connectivity element supporting the first HVPLS spoke connection, wherein the HVPLS spoke recovery mechanism in the MTU will react to the reenabling by transitioning to the first HVPLS spoke connection, and disabling the third HVPLS spoke connection.

5. The method of claim 1, wherein the establishing the third HVPLS spoke connection to the MTU includes signaling a pseudowire for each VPLS instance affected by the HVPLS hub connectivity failure.

6. The method of claim 1, wherein the first HVPLS spoke connection includes a pseudowire for each VPLS instance supported on the MTU.

7. The method of claim 1, wherein prior to establishing the third HVPLS spoke connection, determining that the transition to the second HVPLS spoke connection was successful, wherein the establishment of the third HVPLS spoke connection is conditioned upon the transition being successful.

8. The method of claim 1, wherein the second set of spoke network elements includes an MTU coupled with the first HVPLS hub network element and a first set of one or more customer edge network elements coupled with that MTU, the method further comprising:

the first HVPLS hub network element establishing a fourth HVPLS spoke connection to the MTU of the second set of spoke network elements to restore connectivity to first set of one or more customer edge network elements coupled with that MTU; and the first HVPLS hub network element using a loop removal algorithm to prevent loops.

9. A provider edge network element in a Hierarchical Virtual Private LAN Service (HVPLS) hub to restore HVPLS hub connectivity upon a failure of hub connectivity, the provider edge network element comprising:

a plurality of HVPLS hub facing connectivity elements to provide a plurality of HVPLS hub connections to a plurality of other provider edge network element within the HVPLS hub;

a first set of one or more spoke facing connectivity elements to provide a primary HVPLS spoke connection to a first MTU, and a second set of one or more spoke facing connectivity elements to provide HVPLS hub connectivity to one or more other HVPLS hub network elements;

a hub connectivity failure recovery module coupled with the plurality of HVPLS hub facing connectivity elements and the first and second set of spoke facing connectivity elements, the hub connectivity failure recovery module including, a hub facing connectivity element state detection module to monitor the plurality of HVPLS hub facing connectivity elements to detect hub connectivity failure, a hub connectivity failure declaration and reporting module coupled with the hub facing connectivity element state detection module, the hub connectivity failure declaration and reporting module to declare a failure of hub connectivity upon a certain amount of hub facing connectivity elements losing hub connectivity, a spoke facing connectivity element state switching module coupled with the hub connectivity failure declaration and reporting module, the spoke facing connectivity element state switching module to fabricate a failure of the primary HVPLS spoke connection to cause the first MTU to transition to a secondary HVPLS spoke connection that couples one of the other provider edge network elements, and a dynamic spoke manager to establish a dynamic HVPLS spoke connection to the first MTU to restore HVPLS hub connectivity to the other HVPLS hub network elements.

10. The network element of claim 9, wherein the network element further is to transmit traffic received from the other HVPLS hub network elements destined for the HVPLS hub to the first MTU through established dynamic HVPLS spoke connection.

11. The network element of claim 9, wherein the one or more other HVPLS hub network elements includes a second MTU and one or more customer edge network elements.

12. The network element of claim 9, further comprising:

the hub facing connectivity element state detection module to monitor those hub facing connectivity elements which have lost hub connectivity to detect a reestablishment of hub connectivity;

the hub connectivity failure declaration and reporting module to declare the reestablishment of hub connectivity upon a certain amount of hub facing connectivity elements reestablishing hub connectivity;

the spoke facing connectivity element state switching module to end the fabricated failure of the primary HVPLS spoke connection to cause the first MTU to transition to the primary HVPLS spoke connection; and the dynamic spoke manager to disable the dynamic HVPLS spoke connection to the first MTU.

13. The network element of claim 9, wherein the establish the dynamic HVPLS spoke connection includes signaling a pseudowire for each VPLS instance affected by the HVPLS hub connectivity failure.

14. The network element of claim 9, wherein prior to the dynamic spoke manager establishing the dynamic HVPLS spoke connection, the dynamic spoke manager to determine that the transition to the secondary HVPLS spoke connection was successful, wherein the establishment of the dynamic HVPLS spoke connection is conditioned upon the transition being successful.

15. The network element of claim 9, wherein the hub facing connectivity element state detection module is to use operations, administration, and maintenance (OAM) mechanisms to monitor the plurality of HVPLS hub facing connectivity elements.

16. A non-transitory machine-readable storage medium that provides instructions that, if executed by a processor, will cause said processor to perform operations for a first one of a plurality of hierarchical virtual private LAN service (HVPLS) hub network elements to recover from a failure of HVPLS hub connectivity on behalf of at least some of a plurality of spoke network elements coupled with the first HVPLS hub network element, wherein the first HVPLS hub network element provides HVPLS hub connectivity to those spoke network elements, wherein the plurality of spoke network elements includes a first set of one or more spoke network elements including a multi-tenant unit (MTU) coupled with the first HVPLS hub network element by a first HVPLS spoke connection and a second set of one or more spoke network elements coupled with the first HVPLS hub network element, wherein the first HVPLS hub network element is also coupled with each of the other of the plurality of HVPLS hub network elements with a hub connection, operations comprising:

monitoring for a failure of the HVPLS hub connectivity of the first HVPLS hub network element through a plurality of HVPLS hub facing connectivity elements of the first HVPLS hub network element, wherein the plurality of HVPLS hub facing connectivity elements provide hub connections to the others of the plurality of HVPLS hub network elements;

detecting the failure of the HVPLS hub connectivity of the first HVPLS hub network element;

fabricating a failure of the first HVPLS spoke connection by disabling within the first HVPLS hub network element one or more HVPLS spoke facing connectivity elements supporting the first HVPLS spoke connection, wherein a HVPLS spoke recovery mechanism in the MTU will react to the fabricated failure of the first HVPLS spoke connection by transitioning to a second HVPLS spoke connection that couples the MTU to a second of the plurality of HVPLS hub network elements that is designated as a secondary connection point to the HPVLS hub for the MTU; and the first HVPLS hub network element establishing a third HVPLS spoke connection to the MTU to restore HVPLS hub connectivity to the second set of spoke network elements coupled with the first HVPLS hub network element.

17. The non-transitory machine-readable storage medium of claim 16, further comprising the first HVPLS hub network element transmitting traffic received from the second set of spoke network elements destined for the HVPLS hub to the MTU which in turn transmits the traffic to the second HVPLS hub network element over the second HVPLS spoke connection.

18. The non-transitory machine-readable storage medium of claim 16, wherein the second set of spoke network elements includes an MTU coupled with the first HVPLS hub network element and a first set of one or more customer edge network elements coupled with that MTU, the second set of spoke network elements further including a second set of one or more customer edge network elements directly coupled with the first HVPLS hub network element over one or more attachment connections respectively.

19. The non-transitory machine-readable storage medium of claim 16, further comprising:
the HVPLS hub network element monitoring for a reestablishment of its HVPLS hub connectivity; and
upon detecting the reestablishment of the HVPLS hub connectivity, performing the following:
reenabling each disabled spoke facing connectivity element supporting the first HVPLS spoke connection, wherein the HVPLS spoke recovery mechanism in the MTU will react to the reenabling by transitioning to the first HVPLS spoke connection, and
disabling the third HVPLS spoke connection.

20. The non-transitory machine-readable storage medium of claim 16, wherein the establishing the third HVPLS spoke connection to the MTU includes signaling a pseudowire for each VPLS instance affected by the HVPLS hub connectivity failure.

21. The non-transitory machine-readable storage medium of claim 16, wherein the first HVPLS spoke connection includes a pseudowire for each VPLS instance supported on the MTU.

22. The non-transitory machine-readable storage medium of claim 16, wherein prior to establishing the third HVPLS spoke connection, determining that the transition to the second HVPLS spoke connection was successful, wherein the establishment of the third HVPLS spoke connection is conditioned upon the transition being successful.

23. The non-transitory machine-readable storage medium of claim 16, wherein the second set of spoke network elements includes an MTU coupled with the first HVPLS hub network element and a first set of one or more customer edge network elements coupled with that MTU, the method further comprising:
the first HVPLS hub network element establishing a fourth HVPLS spoke connection to the MTU of the second set of spoke network elements to restore connectivity to first set of one or more customer edge network elements coupled with that MTU; and
the first HVPLS hub network element using a loop removal algorithm to prevent loops.

* * * * *

UNITED STATES PATENT AND TRADEMARK OFFICE
CERTIFICATE OF CORRECTION

| | | |
|---|---|---|
| PATENT NO. | : 8,064,338 B2 | Page 1 of 1 |
| APPLICATION NO. | : 12/347863 | |
| DATED | : November 22, 2011 | |
| INVENTOR(S) | : Kini et al. | |

It is certified that error appears in the above-identified patent and that said Letters Patent is hereby corrected as shown below:

In Column 18, Line 40, in Claim 1, delete "HPVLS" and insert -- HVPLS --, therefor.

In Column 21, Line 17, in Claim 16, delete "HPVLS" and insert -- HVPLS --, therefor.

Signed and Sealed this
Fourteenth Day of February, 2012

David J. Kappos
*Director of the United States Patent and Trademark Office*